E. CHAMBERLIN.

Assignor to himself, L. & E. CHAMBERLIN.

Vehicle-Spring.

No. 8,449. Reissued Oct. 15, 1878.

Witnesses:

P. L. Dietrich

Frank H. Duffy.

Inventor:

Edwin Chamberlin

Per C. H. Watson & Co Attorneys.

N. PETERS, PHOTO-LITHOGRAPHER, WASHINGTON, D. C.

UNITED STATES PATENT OFFICE.

EDWIN CHAMBERLIN, OF TROY, NEW YORK, ASSIGNOR TO HIMSELF, LEE CHAMBERLIN, AND EDWARD CHAMBERLIN.

IMPROVEMENT IN VEHICLE-SPRINGS.

Specification forming part of Letters Patent No. 151,274, dated May 26, 1874; Reissue No. 6,611, dated August 24, 1875; Reissue No. 8,449, dated October 15, 1878; application filed September 10, 1878.

DIVISION A.

*To all whom it may concern:*

Be it known that I, EDWIN CHAMBERLIN, of Troy, in the county of Rensselaer and State of New York, have invented certain new and useful Improvements in Vehicle-Springs; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention relates to hanging side-bar buggy-bodies; and it consists in increasing the elasticity and ease of riding of side-bar buggies by hanging the body by certain pivots and slats to springs that are placed or secured under and parallel to the side bars, as will be hereinafter more fully set forth.

Figure 1:
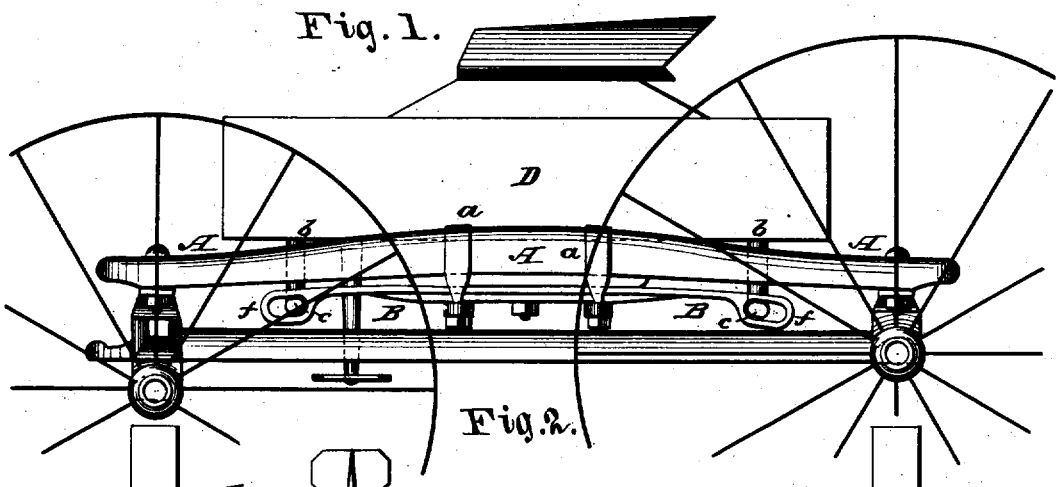
Figure 2:
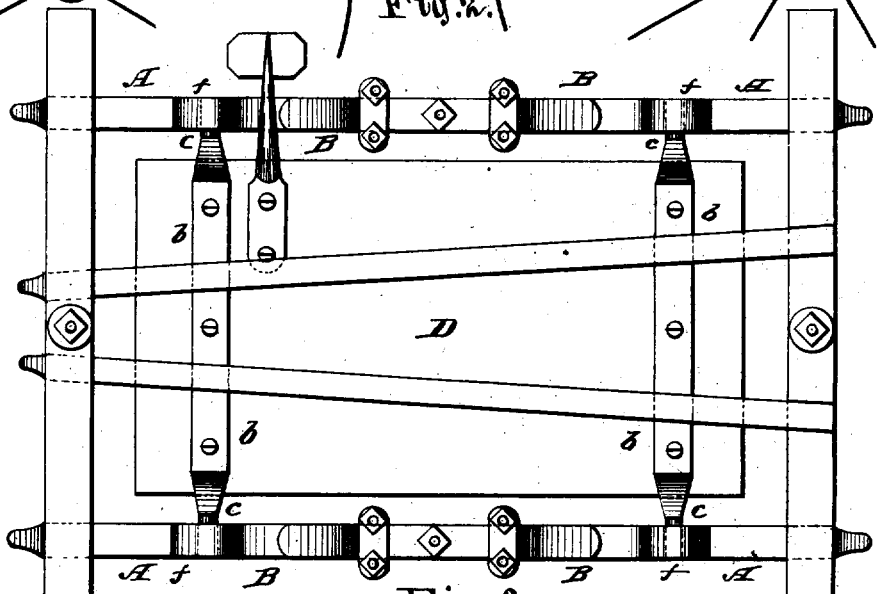
Figure 3:
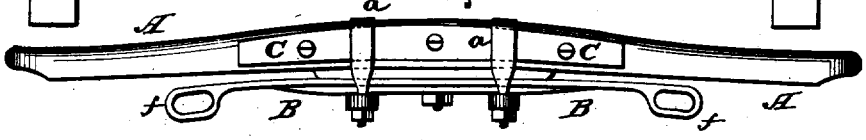
Figure 4:
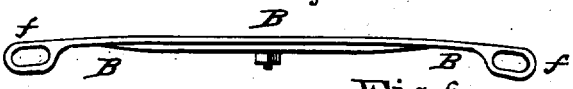
Figure 5:
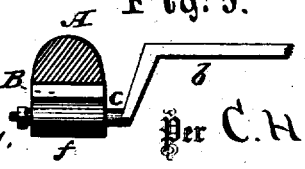
Figure 6:
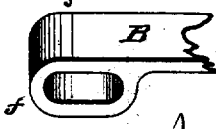

In the annexed drawing, Figure 1 is a side view of a buggy-body hung with my improvements. Fig. 2 is a bottom view of the same. Fig. 3 is a view of the inner side of the side bar with spring underneath. Fig. 4 is a side view of the spring. Figs. 5 and 6 are detailed views of parts of my invention.

The construction of side-bar buggies has been such that ease of riding and elasticity have been sacrificed to lightness and compactness of form over the ordinary end-spring buggy.

The objects of this invention are secured by placing the half-springs B parallel to and under the side bars A and using them in combination for hanging the body D. The springs B are secured under the side bars A by the clips *a a*, or any other well-known means. The springs B are provided with eyes *f* in either or both ends, that receive the pivot *c* on the end of the body-loop *b*, which is bolted fast to the body. The springs B move on the pivots *c* during all the movements of the carriage, either in a circular or longitudinal direction, or both.

As the greatest strain comes on the side bar A, it is strengthened by the plate C, which is let into the wood on the inner side of the bar, as shown in Fig. 3; or it may be simply attached to the side of the bar, if desired.

The spring may be made any length, and attached directly to the body by the pivot *c* and loop *b*, or any well-known means. The bars A are attached at their ends to the running parts, as is usual in side-bar buggies.

By this arrangement of springs, bars, and body-loops for hanging buggy-bodies the body is hung low, rendering the carriage compact, and giving great elasticity, and the springs are connected to the side bars to form a center-bearing for the springs, while the body is attached to the springs at or near their ends. By this means all weight bears directly on the center of the springs, and the body has four points of bearing on the springs, whereby the body is held more perfectly balanced should the weight in the wagon happen to be more upon one side than the other.

Having thus fully described my invention, what I claim as new, and desire to secure by Letters Patent, is—

1. The side bars A and springs B beneath the side bars, in combination with a body, D, the springs being connected to the side bars at or near the center to form a center-bearing for the springs, and the body being connected to the springs at or near their ends, substantially as and for the purposes herein set forth.

2. The body-loops *b*, provided with pivots *c*, in combination with springs B and bars A, substantially as and for the purposes set forth.

3. The plate C, in combination with the bar A, substantially as and for the purpose set forth.

In testimony that I claim the foregoing I have hereunto set my hand this 31st day of July, 1878.

EDWIN CHAMBERLIN.

Witnesses:

C. H. WATSON,

M. S. STOVER.